US009206840B2

(12) United States Patent
Omori

(10) Patent No.: US 9,206,840 B2
(45) Date of Patent: *Dec. 8, 2015

(54) RADIAL FOIL BEARING

(71) Applicant: IHI Corporation, Tokyo (JP)

(72) Inventor: Naomichi Omori, Tokyo (JP)

(73) Assignee: IHI CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,781

(22) Filed: May 6, 2014

(65) Prior Publication Data
US 2014/0241653 A1  Aug. 28, 2014

Related U.S. Application Data

(63) Continuation of application No. PCT/JP2012/078840, filed on Nov. 7, 2012.

(30) Foreign Application Priority Data

Nov. 9, 2011  (JP) .................................. 2011-245706

(51) Int. Cl.
F16C 32/06 (2006.01)
F16C 17/02 (2006.01)
F16C 43/02 (2006.01)

(52) U.S. Cl.
CPC ............... *F16C 17/024* (2013.01); *F16C 43/02* (2013.01); *F16C 2226/60* (2013.01); *F16C 2226/76* (2013.01)

(58) Field of Classification Search
CPC .................................................... F16C 17/024
See application file for complete search history.

(56) References Cited

U.S. PATENT DOCUMENTS

| 3,809,443 | A |   | 5/1974 | Cherubim | 308/9 |
| 4,295,689 | A |   | 10/1981 | Licht | 308/9 |
| 4,552,466 | A |   | 11/1985 | Warren | 384/103 |
| 4,767,222 | A | * | 8/1988 | Paletta et al. | 384/106 |
| 5,634,723 | A |   | 6/1997 | Agrawal | 384/106 |
| 5,902,049 | A | * | 5/1999 | Heshmat | 384/106 |
| 5,915,841 | A |   | 6/1999 | Weissert | 384/104 |

(Continued)

FOREIGN PATENT DOCUMENTS

| CN | 1918392 A | 2/2007 |
| CN | 101821519 A | 9/2010 |

(Continued)

OTHER PUBLICATIONS

International Search Report and Written Opinion mailed Feb. 19, 2013 in corresponding PCT International Application No. PCT/JP2012/078840.

(Continued)

*Primary Examiner* — Thomas R. Hannon
(74) *Attorney, Agent, or Firm* — Ostrolenk Faber LLP

(57) ABSTRACT

The radial foil bearing for surrounding and supporting a rotary shaft includes a cylindrical top foil disposed so as to face the rotary shaft, a back foil disposed at a radially outer side of the top foil, and a cylindrical bearing housing accommodating the top foil and the back foil. Engagement-projecting portions are provided on both ends of an inner circumferential surface of the bearing housing. Engagement notches engaging with the engagement-projecting portions are formed on both ends of the back foil.

12 Claims, 5 Drawing Sheets

(56) References Cited

U.S. PATENT DOCUMENTS

| | | | |
|---|---|---|---|
| 5,938,341 A * | 8/1999 | Eccles | 384/106 |
| 8,500,331 B2 | 8/2013 | Kim et al. | 384/106 |
| 8,845,193 B2 * | 9/2014 | Omori | 384/103 |
| 2002/0054718 A1 | 5/2002 | Weissert | 384/104 |
| 2002/0097927 A1 | 7/2002 | Lee et al. | 384/103 |
| 2007/0047858 A1 | 3/2007 | Hurley et al. | 387/106 |
| 2014/0147063 A1 * | 5/2014 | Omori | 384/103 |
| 2015/0030269 A1 * | 1/2015 | Omori | 384/103 |

FOREIGN PATENT DOCUMENTS

| | | |
|---|---|---|
| CN | 101839281 A | 9/2010 |
| CN | 102003463 A | 4/2011 |
| JP | U-A-60-175914 | 11/1985 |
| JP | 2002-061645 | 2/2002 |
| JP | A-2004-011839 | 1/2004 |
| JP | 2004-190762 | 7/2004 |
| JP | 2004-270904 | 9/2004 |
| JP | 2006-057652 | 3/2006 |
| JP | 2007-092994 | 4/2007 |
| JP | 2008-200823 | 9/2008 |
| JP | 2009-299748 | 12/2009 |
| JP | A-2009-287654 A | 12/2009 |
| JP | 2011-017385 | 1/2011 |
| JP | 2011-033176 | 2/2011 |
| JP | 2011-144846 | 7/2011 |
| JP | 2012-241775 | 12/2012 |
| JP | 2013-024344 | 2/2013 |
| JP | 2013-032799 | 2/2013 |
| JP | 2013-087789 | 5/2013 |
| KR | 10-2007-0012591 A | 1/2007 |
| WO | WO 2013/018618 A1 | 2/2013 |
| WO | WO 2013/024674 A1 | 2/2013 |

OTHER PUBLICATIONS

International Search Report mailed Sep. 25, 2012 for PCT International Application No. PCT/JP2012/067330 with English translation.
Written Opinion of the International Searching Authority mailed Sep. 25, 2012 for PCT International Application No. PCT/JP2012/067330 with English translation.
Notice of Allowance and Fee(s) Due mailed Jun. 19, 2014 for U.S. Appl. No. 14/167,414.
Office Action mailed Jan. 5, 2015 for Korean Application No. 10-2014-7003553 with English translation.
European Patent Office Search Report mailed Mar. 16, 2015 for European Application No. 12820592.9.
Notice of Allowance mailed May 19, 2015 for Japanese Application No. 2011-168575 with English translation.
Office Action mailed May 1, 2015 for Korean Application No. 10-2014-7015163 with English translation.
Chinese Notice of Allowance mailed Jun. 24, 2015 for Chinese Application No. 201280037811.8 with English translation.
Office Action dated Sep. 6, 2015 in corresponding Chinese Patent Application No. 201280053836.7 with English language translation of part of Search Report (7 pages).

* cited by examiner

RADIAL FOIL BEARING

This application is a Continuation application based on International Application No. PCT/JP2012/078840, filed Nov. 7, 2012, which claims priority on Japanese Patent Application No. 2011-245706, filed Nov. 9, 2011, the contents of both of which are incorporated herein by reference.

TECHNICAL FIELD

The present invention relates to a radial foil bearing.

BACKGROUND ART

In the related art, as a bearing for a high-speed rotating body, a radial bearing which is used to be attached to surround a rotary shaft is known. As such a radial bearing, a radial foil bearing is well known, which includes a thin sheet-like top foil which forms a bearing surface, a back foil which elastically supports the top foil, and a cylindrical bearing housing which accommodates the top foil and the back foil. As the back foil of the radial foil bearing, a bump foil in which a thin sheet is formed into a wave shape is mainly used.

In general, in such a radial foil bearing, in order to prevent the top foil or the back foil from being detached from the bearing housing, one end (a toe portion) of the top foil or the back foil is directly connected to the bearing housing or is indirectly fixed thereto via a spacer, by spot welding.

Moreover, in order to perform a mechanical fixation instead of the welding, a radial foil bearing is also known which has a structure in which an end of the top foil or the back foil (bump foil) is bent by bending and the bent portion is engaged with an engagement groove formed on the bearing housing (for example, refer to Patent Documents 1 to 3).

DOCUMENT OF RELATED ART

Patent Document

[Patent Document 1] Japanese Unexamined Patent Application, First Publication No. 2011-033176
[Patent Document 2] Japanese Unexamined Patent Application, First Publication No. 2011-017385
[Patent Document 3] Japanese Unexamined Patent Application, First Publication No. 2002-061645

SUMMARY OF INVENTION

Technical Problem

However, if the fixation of the back foil (bump foil) to the bearing housing is performed by welding, the back foil or the bearing housing may be deformed by heat applying, and distortion may occur in the top foil due to the influence. Moreover, also in the bearings disclosed in Patent Documents 1 to 3, since the top foil or the back foil is bent, distortion may occur in the top foil. That is, when the distortion occurs in each of the top foil and the back foil by the bending, since the back foil supports the top foil, the distortion of the back foil influences the top foil, and thus, there is a possibility of larger distortion occurring in the top foil.

Moreover, a thickness of a fluid lubricating film of a foil bearing, which is formed between the rotary shaft and the top foil due to rotation of the rotary shaft, is approximately 10 µm, which is extremely thin. Accordingly, if slight distortion occurs in the top foil, a load capability or dynamic characteristics (rigidity and damping performance) of the bearing are influenced, and the desired performance may not be obtained.

Moreover, in order to improve bearing performance of the radial foil bearing, it is considered that the back foil being divided in plurality in the circumferential direction thereof is effective. However, in this case, the number of fixation points of the back foil with respect to the bearing housing is increased, and welding locations are increased in the fixation by the welding in the related art. Accordingly, the number of processes may be increased, and manufacturing costs may be enlarged. Moreover, when the welding locations are increased, if all locations to be welded are not properly welded, the bearing cannot be delivered as a product, and thus, quality maintenance becomes difficult, and the manufacturing cost may be increased due to a percentage drop in efficiency.

The present invention was made in consideration of the above-described circumstances, and an object thereof is to provide a radial foil bearing which can sufficiently decrease the distortion occurring in the top foil, can obtain favorable performance as designed with respect to load capability or dynamic characteristics (rigidity and damping performance) of a bearing, and can suppress a cost increase.

Solution to Problem

According to a first aspect of the present invention, a radial foil bearing for surrounding and supporting a rotary shaft, includes: a cylindrical top foil disposed so as to face the rotary shaft; a back foil disposed at a radially outer side of the top foil; and a cylindrical bearing housing accommodating the top foil and the back foil. In addition, engagement-projecting portions are provided on both ends of an inner circumferential surface of the bearing housing. Engagement notches engaging with the engagement-projecting portions are formed on both ends of the back foil.

In this radial foil bearing, the engagement notches formed on both ends of the back foil are engaged with the engagement-projecting portions provided on both ends of the inner circumferential surface of the bearing housing, and thus, the back foil is fixed to the bearing housing. Accordingly, the back foil can be accommodated to be fixed to the bearing housing without performing spot welding or bending on the back foil. Therefore, occurrence of the distortion of the top foil due to the influence of the distortion of the back foil caused by the spot welding or the bending is prevented, and thus, the distortion of the top foil can be sufficiently decreased. Moreover, since welding of the back foil is not required, defective assembly or unevenness of assembly due to defective welding can be removed.

According to a second aspect of the present invention, in the first aspect, engagement-depressed portions, which extend from the inner circumferential surface of the bearing housing toward an outer circumferential surface thereof, may be formed on both side surfaces of the bearing housing so as to be opposite to each other. In addition, an engagement groove may be formed on the inner circumferential surface of the bearing housing between the engagement-depressed portions opposite to each other, wherein the engagement groove communicates with the engagement-depressed portions and a depth of the engagement groove toward the outer circumferential surface of the bearing housing is less than that of the engagement-depressed portions. A locking member may be locked into the engagement-depressed portions and the engagement groove. The locking member may include a pair of engagement arms which engage with the engagement-depressed portions and a connection portion which engages with the engagement groove and connects the pair of engagement arms. Parts of the pair of engagement arms opposite to portions thereof engaging with the engagement-depressed portions may be provided so as to project from the inner circumferential surface of the bearing housing. The engagement-projecting portions may be composed of the parts of the pair of engagement arms.

Accordingly, the engagement-projecting portions can be formed on the bearing housing through relatively simple machining and assembly.

According to a third aspect of the present invention, in the first or second aspect, the engagement notches may be formed at a center portion in a circumferential direction of the back foil.

The back foil elastically supports the top foil. Accordingly, when the back foil receives a load from the top foil, the back foil is deformed in the circumferential direction thereof, and thus, accepts the bending of the top foil and supports the top foil. However, when the back foil is deformed in the circumferential direction, since the back foil is influenced by friction between the bearing housing and the back foil, although the back foil is easily deformed at a free end thereof which is not fixed to the bearing housing, the back foil is not easily deformed at a fixation end thereof which is fixed to bearing housing. In addition, support rigidity of the foil bearing is related to easiness of deformation of the back foil. Accordingly, there is a difference in the support rigidity between the free end and the fixation end, and thus, uniform support rigidity may not be obtained in the entire bearing.

In the present invention, the engagement notches are formed at the center portion in the circumferential direction of the back foil, and the fixation using the engagement-projecting portions is performed at the center portion in the circumferential direction of the back foil. Therefore, compared to a case where one end in the circumferential direction of the back foil is fixed using the engagement-projecting portion, a distance between the fixation end (the fixation portion by the engagement-projecting portions) and the free end (the end of the back foil) becomes approximately half, the influence of friction between the bearing housing and the back foil can be suppressed, and the difference in the support rigidity between the free end and the fixation end can be sufficiently decreased.

According to a fourth aspect of the present invention, in the first or second aspect, the back foil may be configured to include back foil pieces which are disposed in a circumferential direction of the top foil. In addition, the engagement notches are formed in each of the back foil pieces.

Accordingly, since the distance between the fixation end and the free end in the back foil piece is decreased, as described above, the difference in the support rigidity between the free end and the fixation end can be decreased. Therefore, unevenness of the support rigidity in the entire back foil can be decreased.

According to a fifth aspect of the present invention, in the fourth aspect, the engagement notches may be formed at a center portion in a circumferential direction of a back foil piece.

Accordingly, the difference in the support rigidity between the free end and the fixation end in each back foil piece can be further decreased. Therefore, unevenness of the support rigidity in the entire back foil can be decreased.

According to a sixth aspect of the present invention, in any one of the first to third aspects, the back foil may be formed into a wave shape in which valley portions contacting the bearing housing and peak portions contacting the top foil are alternately formed in a circumferential direction of the bearing housing. In addition, the engagement notches may be formed on a valley portion.

Accordingly, since the peak portions of the back foil contact the top foil, the engagement-projecting portions engaging with the engagement notches formed on the valley portion can be disposed so as not to contact the top foil.

According to a seventh aspect of the present invention, in the fourth or fifth aspect, the back foil piece may be formed into a wave shape in which valley portions contacting the bearing housing and peak portions contacting the top foil are alternately formed in the circumferential direction of the bearing housing. Moreover, the engagement notches may be formed on a valley portion.

Accordingly, since the peak portions of the back foil piece contact the top foil, the engagement-projecting portions engaging with the engagement notches formed on the valley portion can be disposed so as not to contact the top foil.

Effects of Invention

According to a radial foil bearing of the present invention, occurrence of distortion in the back foil can be prevented, and distortion of the top foil can be sufficiently decreased. Accordingly, favorable performance as designed can be obtained with respect to load capability or dynamic characteristics (rigidity and damping performance) of the bearing.

In addition, since welding is not required, defective assembly or unevenness of assembly due to defective welding can be suppressed, and thus, reduction in costs can be realized by an improved efficiency percentage.

DESCRIPTION OF EMBODIMENTS

Figure 1:
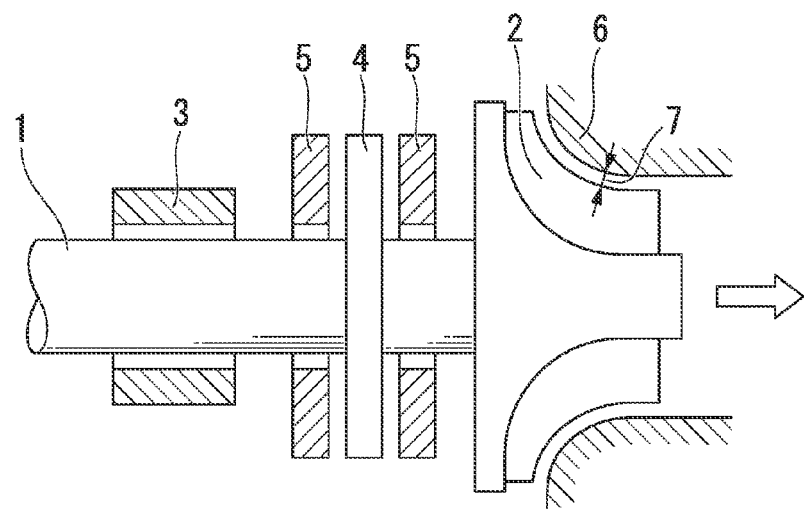
FIG. 1 is a schematic view showing a turbo machine to which a radial foil bearing according to a first embodiment of the present invention is applied.

Hereinafter, a radial foil bearing of the present invention will be described in detail with reference to the drawings. Moreover, in order to show each member in a recognizable size in the drawings below, a scale of each member is appropriately changed.

(First Embodiment)

FIG. 1 is a schematic view showing a turbo machine to which a radial foil bearing of a first embodiment of the present invention is applied. In FIG. 1, a reference numeral 1 indicates a rotary shaft, a reference numeral 2 indicates an impeller provided in a tip portion of the rotary shaft, and a reference numeral 3 indicates the radial foil bearing according to the present invention. Moreover, in FIG. 1, only one radial foil bearing is shown while another radial foil bearing is omitted. However, in general, two radial foil bearings are provided in an axial direction of the rotary shaft 1, and thus, a support structure of the rotary shaft 1 is configured. Accordingly, although it is not shown, two radial foil bearings 3 are also provided in the present embodiment.

A thrust collar 4 is fixed to the rotary shaft 1 near a portion in which the impeller 2 is formed. On both sides of the thrust collar 4, thrust bearings 5 are disposed so as to face the thrust collar 4.

In addition, the impeller 2 is disposed inside a housing 6 which is a stationary member, and a tip clearance 7 is provided between the impeller 2 and the housing 6.

Moreover, the radial foil bearing 3 is attached to the rotary shaft 1 closer to the center of the rotary shaft 1 than the thrust collar 4 so as to surround the rotary shaft 1.

Figure 2A:
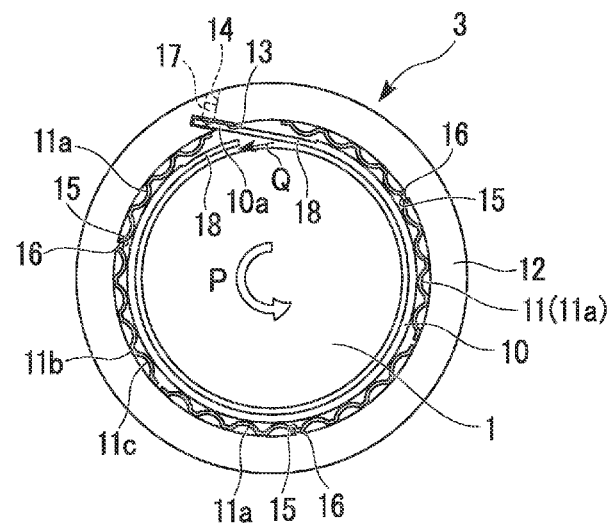
FIG. 2A is a schematic side view of the radial foil bearing according to the first embodiment of the present invention.
Figure 2B:
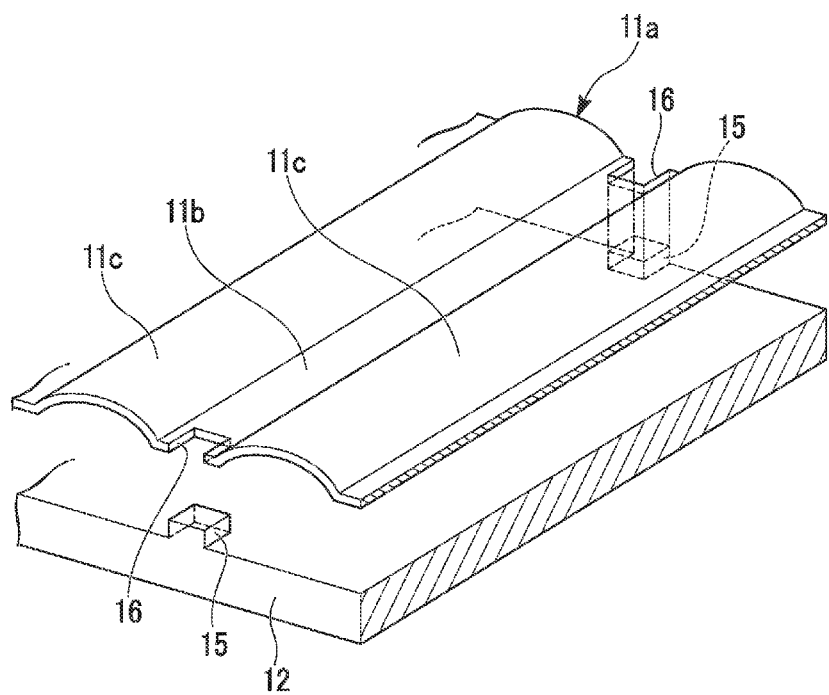
FIG. 2B is an exploded perspective view of a main portion of FIG. 2A.
Figure 2C:
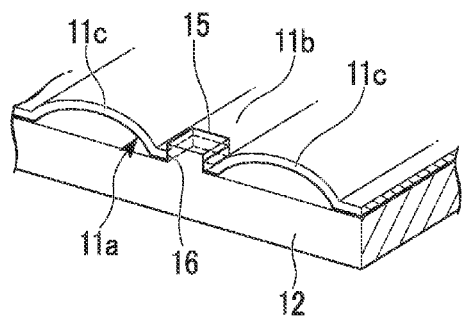
FIG. 2C is a perspective view of a main portion of FIG. 2A.

FIGS. 2A to 2C show the first embodiment of the radial foil bearing which is applied to the turbo machine having the above-described configuration. As shown in FIG. 2A which is a side view showing the schematic configuration of the radial foil bearing 3, the radial foil bearing 3 of the present embodiment is formed into a cylindrical shape which surrounds the rotary shaft 1 and supports the rotary shaft 1. The radial foil bearing 3 is configured to include a cylindrical top foil 10 which is disposed so as to face the rotary shaft 1, a back foil 11 which is disposed on the radially outer side of the top foil 10, and a bearing housing 12 which is disposed on the radially outer side of the back foil 11. In addition, FIG. 2A is a side view of the radial foil bearing 3 viewed from an axial direction of the rotary shaft 1.

The bearing housing 12 composes the outermost portion of the radial foil bearing 3 and is formed into a cylindrical shape using metal or the like. The bearing housing 12 accommodates the back foil 11 and the top foil 10 in the inner portion of the housing. The inner circumferential surface of the bearing housing 12 is provided with a groove 13 which is formed in the axial direction of the bearing housing 12.

That is, the groove 13 is formed on the inner circumferential surface of the bearing housing 12 over the entire length in the axial direction of the bearing housing 12. The depth direction of the groove 13 is formed so as to coincide with a direction in which one end 10a of the top foil 10 described below extends. In addition, the depth of the groove 13 is approximately 2 to 5 mm.

Moreover, a pair of holes 14, which communicates with the groove 13, is formed on the outer circumferential surface of the bearing housing 12. As described below, male screws are inserted into the holes 14, wherein the male screws are used to fix one end 10a of the top foil 10 to the inner portion of the groove 13 after the end 10a is inserted into the groove 13. Female screw portions are formed on the inner circumferential surfaces of the holes 14.

Moreover, as shown in FIG. 2B which is an exploded perspective view of a main portion of FIG. 2A, engagement-projecting portions 15 are formed and disposed on both ends (both ends in the axial direction of the rotary shaft 1) of the inner circumferential surface of the bearing housing 12 so as to be opposite (to be opposite in the axial direction of the rotary shaft 1) to each other. That is, a pair of engagement-projecting portions 15 is disposed at the same position in the circumferential direction of the bearing housing 12. Each engagement-projecting portion 15 protrudes in a direction perpendicular to the inner circumferential surface of the bearing housing 12 on which the engagement-projecting portions 15 are formed, and is formed into a columnar shape (truncated pyramid shape, or the like) whose lateral cross-section is a rectangular shape. The height of the engagement-projecting portion 15 is set to approximately 0.1 to 0.3 mm, and preferably, is set to approximately 0.2 to 0.25 mm. Moreover, after the bearing housing 12 is formed into a cylindrical shape through a turning process or the like, for example, the engagement-projecting portions 15 can be formed using electric discharge machining, wire-cut electric discharge machining, a combination thereof, or the like.

In the present embodiment, as shown in FIG. 2A, the engagement-projecting portion 15 is disposed at each of positions which approximately divide each side surface of the bearing housing 12 into three in the circumferential direction thereof. Accordingly, the engagement-projecting portions 15 are formed at three locations in the circumferential direction of the bearing housing 12 and are formed on both ends of the inner circumferential surface, and thus, six engagement-projecting portions 15 in total are formed. Engagement notches 16 of the back foil 11 described below engage with the engagement-projecting portions 15. Moreover, in the present embodiment, in a side view of the bearing housing 12 (refer to FIG. 2A), the groove 13 is disposed between two locations (four locations in fact) of three locations (six locations in fact) at which the engagement-projecting portions 15 are disposed.

The back foil 11 is formed of a foil (thin plate such as metal), and elastically supports the top foil 10. For example, as the back foil 11, a bump foil, a sprig foil disclosed in Japanese Unexamined Patent Application, First Publication No. 2006-57652 or Japanese Unexamined Patent Application, First Publication No. 2004-270904, a back foil disclosed in Japanese Unexamined Patent Application, First Publication No. 2009-299748, or the like is used. In the present embodiment, a bump foil is used for the back foil 11. However, the spring foil or the back foil described above may be also used as the back foil of the present invention.

As shown in FIG. 2A, in the present embodiment, the back foil (bump foil) 11 is configured to include three (a plurality of) back foil pieces 11a which are disposed in the circumferential direction of the top foil 10 (in the circumferential direction of the bearing housing 12). In each of the back foil pieces 11a, a foil (thin plate) is formed into a wave shape, and the entire back foil piece in the side view thereof is formed to be an approximately arc shape. All three back foil pieces 11a have the same shape and size as one another. Accordingly, the back foil pieces 11a are disposed so as to divide the inner circumferential surface of the bearing housing 12 into approximately three in the circumferential direction.

Moreover, the back foil pieces 11a are disposed with a certain interval at positions between which the groove 13 is interposed. However, except for the above positions, ends of the back foil pieces are disposed to be close to each other. According to this configuration, three back foil pieces 11a are formed into an approximately cylindrical shape as a whole and are disposed along the inner circumferential surface of the bearing housing 12.

Figure 3A:
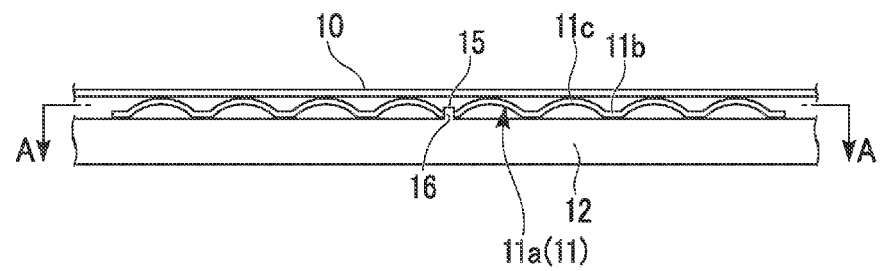
FIG. 3A is a side view in which a main portion of FIG. 2A is flattened and is schematically shown.

Moreover, as shown in FIG. 3A in which a main portion of FIG. 2A is flattened and is schematically shown, the back foil piece 11a formed into a wave shape as described above is configured by alternately forming flat valley portions 11b contacting the bearing housing 12 and curved peak portions 11c contacting the top foil 10 in the circumferential direction (right-left direction in FIG. 3A) of the bearing housing 12. Accordingly, the back foil pieces 11a elastically support the top foil 10 particularly through the peak portions 11c contacting the top foil 10. In addition, fluid passageways are formed by peak portions 11c and valley portions 11b in the axial direction of the radial foil bearing 3. The valley portions 11b are formed into approximately flat shapes along the inner circumferential surface of the bearing housing 12, and the peak portions 11c are curved to protrude toward the inner side (toward top foil 10) in the radial direction of the bearing housing 12 in a side view thereof. In addition, one back foil piece 11a is shown in FIG. 3A.

Figure 3B:
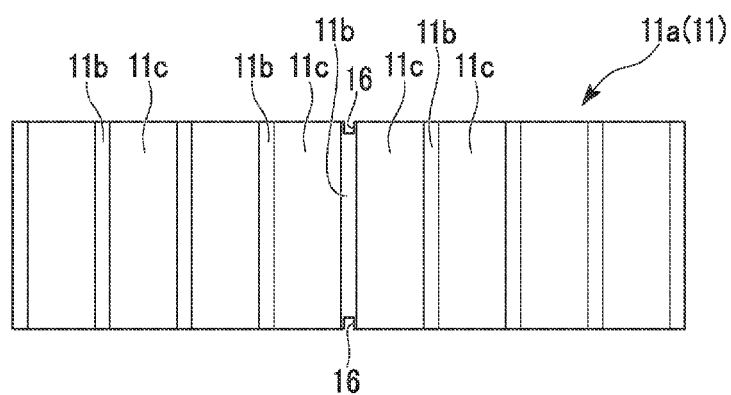
FIG. 3B is a view taken along line A-A of FIG. 3A.

As shown in FIG. 31B which is a view taken along line A-A of FIG. 3A, engagement notches 16 are formed on both ends (both ends in the axial direction of the rotary shaft 1, and both ends in an up-down direction of FIG. 3B) of a center portion (a center portion in the direction parallel to the circumferential direction of the bearing housing 12) in the circumferential direction of each back foil piece 11a. As shown in FIG. 2B, the engagement notches 16 are formed in a valley portion 11b of the back foil piece 11a. More specifically, the valley portion 11b composed of a flat portion formed between peak portions 11c is notched from the side edges toward the inside thereof, rectangular parts are removed therefrom, and thus, the engagement notches 16 are formed.

The engagement notches 16 are formed at positions corresponding to the engagement-projecting portions 15 of the bearing housing 12, that is, at positions which overlap with the engagement-projecting portions 15. Longitudinal and lateral widths of the engagement notch 16 are formed to be approximately the same as longitudinal and lateral widths of the engagement-projecting portion 15 so that the engagement notch 16 engages with the engagement-projecting portion 15. Specifically, the lateral width of the engagement notch in the circumferential direction of the bearing housing 12 is approximately 0.2 to 0.4 mm, and the longitudinal width thereof in the axial direction of the bearing housing 12 is approximately 1 to 2 mm.

Moreover, with respect to formation of the engagement notches 16, in order to prevent occurrence of burr and distortion due to stress, it is preferable that etching processing or electric discharge machining be used with respect to a foil. That is, after the engagement notches 16 are formed on the foil using the etching processing or electric discharge machining, it is preferable that the back foil piece 11a be formed by performing press molding on the foil to form peak portions 11c and valley portions 11b.

According to this configuration, as shown in FIG. 2C, the engagement notch 16 of the back foil piece 11a engages with the engagement-projecting portion 15 of the bearing housing 12.

As shown in FIG. 2A, the top foil 10 is formed so as to be cylindrically wound along the inner surface of the back foil 11 including three back foil pieces 11a. The top foil 10 is disposed so that the tip of one end 10a thereof engages with the groove 13 which is formed in the bearing housing 12.

The top foil 10 is formed by cylindrically winding a rectangular metal foil in which the long edge thereof is in a bearing circumferential direction and the short edge thereof is in a bearing axial direction, wherein the metal foil is wound in the length direction of the long edge (in the bearing circumferential direction).

The top foil 10 is not wound so that both ends of the above metal foil butt each other, but is wound so that the one end 10a overlaps with the outside of the other end. In addition, the one end 10a is formed so as to extend in a tangential direction at a predetermined position of a cylinder which is formed of portions other than the one end 10a.

Moreover, the groove 13 of the bearing housing 12 is formed so that the depth direction thereof coincides with the extending direction of the one end 10a of the top foil 10.

Accordingly, the top foil 10 is disposed so that the extending direction of the one end 10a thereof coincides with the depth direction of the groove 13, and the tip of the one end 10a engages with the groove 13. Therefore, since the top foil 10 is not subjected to stress from the groove 13 and is not deformed in the state where the one end 10a engages with the groove 13, distortion does not occur in the top foil.

Moreover, in the present embodiment, the one end 10a of the top foil 10 which engages with the groove 13 is fixed into the groove 13 by male screws 17. That is, the male screws 17 are screwed and inserted into the holes 14, and thus the one end 10a tightly contacts an inner wall surface of the groove 13 so as to be fixed thereto. Moreover, the deformation of the one end 10a due to tight contact to the inner wall surface of the groove 13 is slight, and accordingly, the distortion of the top foil 10 due to the deformation of the one end 10a almost does not occur.

In addition, thin portions 18 are formed on the one end 10a and on the other end opposite thereto of the top foil 10, wherein the thin portions 18 are thinner than a center portion therebetween. The thin portions 18 are formed to be thinned to be a state where the outer circumferential surfaces (surfaces facing the back foil 11) of the thin portions 18 are depressed from the outer circumferential surface of the center portion.

In order to form the thin portions 18, for example, both ends of the top foil 10 are controlled by the ten micrometers using the etching processing and are formed into a desired thickness (thinness). Specifically, when a bearing diameter φ is set to 35 mm, if the thickness of the top foil 10 is set to 100 μm, the thickness of the thin portion 18 is approximately 80 μm. In addition, compared to bending or the like, in the etching processing, stress occurring in the top foil 10 is extremely small, and accordingly, the distortion almost does not occur in the top foil 10.

Moreover, for example, the length in the circumferential direction of the thin portion 18 corresponds to a distance from the groove 13 to one peak of an end of the back foil 11, wherein the end is positioned to be adjacent to the groove 13.

In this way, the thin portions 18 are formed on both ends of the top foil 10, and thus, both ends (thin portions 18) are easily deformed elastically. Therefore, both ends are bent along curved surfaces composing the inner circumferential surface of the bearing housing 12. Accordingly, a force (local preload) clamping the rotary shaft 1 almost does not occur even at both ends of the top foil 10.

That is, when one end (toe portion) of the top foil is fixed to the bearing housing spot welding as in the related art, the vicinities of both ends (the vicinities of the toe portion and the free end) are not easily deformed along curved surfaces composing the inner circumferential surface of the bearing housing and become a state close to a plane. Accordingly, a force (local preload) clamping the rotary shaft may occur in the portions close to a plane. As a result, problems may occur, that for example, the starting torque is increased, or a temperature during operation becomes higher than a set value. On the other hand, in the top foil 10 of the present embodiment, by forming the thin portions 18 on both ends of the top foil 10, as described above, a force (local preload) clamping the rotary shaft 1 almost does not occur.

In addition, the thin portions 18 are formed to be thinned to be the state where the outer circumferential surfaces of both ends of the top foil 10 are depressed from the outer circumferential surface of the center portion of the top foil. Therefore, a gap is formed between the thin portion 18 and one peak of the end of the back foil 11 supporting a side of the outer circumferential surface of the thin portion. Accordingly, in the thin portions 18, the occurrence of a force (local preload) clamping the rotary shaft 1 is securely prevented.

Next, operations of the radial foil bearing 3 having the above-described configuration will be described.

In a state where the rotary shaft 1 stops, the top foil 10 is pressed to the rotary shaft 1 by the back foil 11 (three back foil pieces 11a) and thus tightly contacts the rotary shaft 1.

Moreover, in the present embodiment, since both ends of the top foil 10 become the thin portions 18, a force (local preload) clamping the rotary shaft 1 almost does not occur in the thin portions 18.

If the rotary shaft 1 starts being rotated in the direction of an arrow P of FIG. 2A, at first, the rotary shaft 1 is rotated at a low speed, and thereafter, is gradually accelerated and rotated at a high speed. Therefore, as shown by an arrow Q of FIG. 2A, an ambient fluid is led between the one end 10a of the top foil 10 and one end of the back foil piece 11a, and flows between the top foil 10 and the rotary shaft 1. Accordingly, a fluid lubricating film is formed between the top foil 10 and the rotary shaft 1.

A film pressure of the fluid lubricating film operates on the top foil 10, and the peak portions 11c of the back foil piece 11a contacting the top foil 10 are pressed toward the radially outer side thereof. The back foil piece 11a is pressed by the top foil 10, and thus, the peak portions 11c are pressed and extended. Accordingly, the back foil pieces 11a move on the bearing housing 12 in the circumferential direction.

That is, since the back foil pieces 11a (back foil 11) elastically support the top foil 10, when the back foil pieces 11a receive a load from the top foil 10, the back foil pieces 11a are deformed in the circumferential direction, and thus, the back foil pieces 11a accept the bending of the top foil 10 and support the top foil 10.

However, as shown in FIG. 2C, the engagement-projecting portion 15 of the bearing housing 12 engages with the engagement notch 16 which is provided on a side edge portion of the back foil pieces 11a. Accordingly, the back foil pieces 11a is prevented from moving in the circumferential direction on the inner circumferential surface of the bearing housing 12 as a whole. Accordingly, each peak portion 11c of the back foil piece 11a is deformed (is moved) in the circumferential direction in a state where the engagement notch 16 engaging with the engagement-projecting portion 15 is a fixation point (fixation end), but the center of the back foil piece 11a is not deviated from an original position.

In addition, when the back foil piece 11a is deformed (is moved) in the circumferential direction, the back foil piece is influenced by friction between the back foil piece and the bearing housing 12 or between the back foil piece and the top foil 10. Accordingly, both ends of the back foil piece 11a, that is, the free ends and the vicinities thereof are easily deformed (are easily moved). However, the above fixation point (fixation end) and the vicinity thereof are not easily deformed.

Therefore, a difference in support rigidity of the back foil piece 11a is generated between the free end and the fixation end.

However, in the present embodiment, the engagement notches 16 are formed at the center portion in the circumferential direction of the back foil piece 11a, and the fixation point based on the engagement-projecting portions 15 is set at the center portion in the circumferential direction of the back foil piece 11a. Therefore, the distance between the fixation end and the free end is decreased, and thus, the difference in the support rigidity can be decreased. Moreover, in the present embodiment, since the back foil 11 is divided into three back foil pieces 11a, compared to a case where the entire back foil 11 is formed of one foil, the distance between the fixation end and the free end is decreased. Accordingly, the difference in the support rigidity between the free end and the fixation end can be further decreased.

Moreover, when the rotary shaft 1 is rotated at a high speed, since the pair of engagement-projecting portions 15 are disposed so as to interpose the back foil piece 11a from both sides thereof in the axial direction, the engagement-projecting portions 15 also restrict the movement in the axial direction of the back foil piece 11a. Therefore, even when unexpected impact or the like is applied to the bearing, it is possible to prevent the back foil piece 11a from being detached from the bearing housing 12.

Moreover, in a transient state before the fluid lubricating film being formed, solid friction is generated between the rotary shaft 1 and the top foil 10, and the solid friction becomes resistance at the time of starting. However, as described above, a preload does not occur at both ends of the top foil 10. In addition, since the side of the top foil 10 into which the ambient fluid flows becomes the thin portion 18 to be soft, a portion between the end (thin portion 18) of the top foil 10 and the rotary shaft 1 is easily opened. According to this configuration, if the rotary shaft 1 starts, the fluid lubricating film is formed early, and the rotary shaft 1 can be rotated in a non-contact state with respect to the top foil 10 in a short time.

In the radial foil bearing 3, the engagement notch 16 which is formed on each of both ends of the back foil piece 11a engages with the engagement-projecting portion 15 which is provided on each of both ends of the inner circumferential surface of the bearing housing 12. According to this configuration, since the back foil piece 11a is fixed to the bearing housing 12, the back foil piece 11a can be accommodated and fixed into the bearing housing 12 without performing spot welding or bending on the back foil pieces 11a. Accordingly, the occurrence of distortion of the top foil 10 due to the influence of distortion of the back foil 11 (back foil piece 11a) caused by the spot welding or the bending is prevented, and thus, the distortion of the top foil 10 can be sufficiently decreased. Therefore, favorable performance as designed can be exerted with respect to load capability or dynamic characteristics (rigidity and damping performance) of the bearing.

In addition, in the back foil 11, since the spot welding or the bending generating distortion in the related art can be removed, the difficulty degree of manufacturing is decreased, and thus, manufacturing costs can be reduced. That is, since defective assembly due to defective welding or unevenness of the assembly can be restricted, reduction in costs can be realized by an improved efficiency percentage. In addition, since specific bending is not required for the back foil 11, it is possible to perform press molding on the back foil 11 with high accuracy.

Moreover, in order to prevent contact between the engagement-projecting portion 15 and the top foil 10, the height of the peak portion 11c of the back foil 11 (back foil piece 11a) has to be higher than the height of the engagement-projecting portion 15. However, by adjusting the height of the engagement-projecting portion 15, the height of the peak portion 11c of the back foil 11 (back foil piece 11a) can be also adjusted. Accordingly, a desired spring characteristic of the back foil 11 can be easily obtained.

In addition, since welding of the back foil 11 is not performed, efficiency percentage or performance is not influenced by quality of the welding. Accordingly, the bearing has high reproducibility and improved mass productivity, and thus, the dividing of the back foil 11 into pieces in the circumferential direction can be easily performed.

Moreover, the back foil 11 is composed of three (a plurality of) back foil pieces 11a which are disposed in the circumferential direction of the top foil 10, and the engagement notches 16 are formed in each of the back foil pieces 11a. Accordingly, the distance between the fixation end and the free end of the back foil piece 11a is decreased, and thus, the difference in the support rigidity between the free end and the fixation end is decreased, and unevenness of the support rigidity in the entire back foil 11 can be decreased. Since uniform support rigidity and sliding characteristics are obtained in the entire back foil 11, large bearing load capability, and high bearing rigidity and damping capacity can be obtained.

In addition, the engagement notches 16 of the back foil piece 11a are formed at the center portion in the circumferential direction of the back foil piece 11a. Therefore, the distance between the fixation end and the free end in the back foil piece 11a is decreased, and thus, the difference in the support rigidity between the free end and the fixation end is decreased, and unevenness of the support rigidity in the entire back foil 11 can be further decreased.

(Second Embodiment)

Next, a second embodiment of a radial foil bearing which is applied to the turbo machine shown in FIG. 1 will be described with reference to FIGS. 4A to 4C. A radial foil bearing 3A of the present embodiment is different from the radial foil bearing 3 of the first embodiment shown in FIGS. 2A to 2C, 3A, and 3B in the structure of an engagement-projecting portion provided on the inner circumferential surface of the radial foil bearing.

Figure 4A:
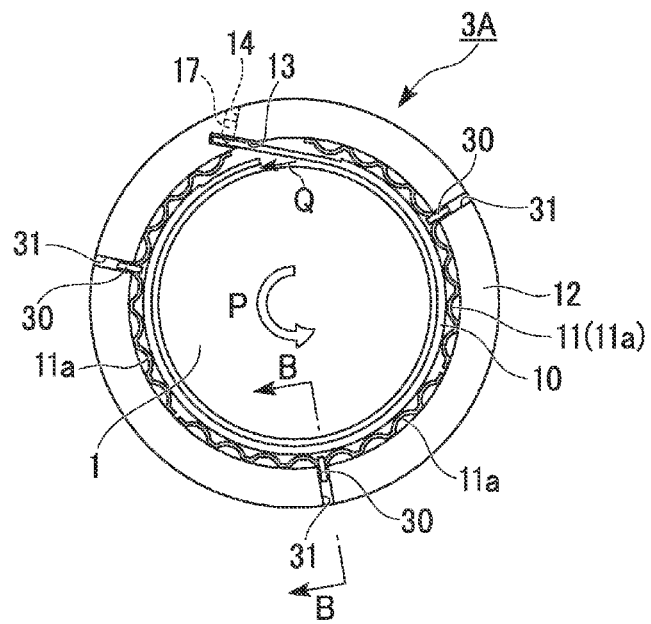
FIG. 4A is a schematic side view of a radial foil bearing according to a second embodiment of the present invention.

In the radial foil bearing 3A of the present embodiment, as shown in FIG. 4A which is a side view showing a schematic configuration thereof, the engagement-projecting portion is formed using a locking member 30. That is, in the present embodiment, groove-shaped engagement-depressed portions 31 extending from the inner circumferential surface of the bearing housing 12 to the outer circumferential surface thereof are formed on both side surfaces of the bearing housing 12 so as to be opposite to each other (opposite to each other in the axial direction of the rotary shaft 1). That is, a pair of engagement-depressed portions 31 is disposed at the same position in the circumferential direction of the bearing housing 12. In the present embodiment, the engagement-depressed portion 31 is disposed at each of positions which approximately divide each side surface of the bearing housing 12 into three in the circumferential direction. The locking member 30 is locked into the engagement-depressed portions 31. Moreover, in the present embodiment, in the side view (refer to FIG. 4A) of the bearing housing 12, the groove 13 is disposed between two locations (four locations in fact) of three locations (six locations in fact) at which the engagement-depressed portions 31 are disposed.

Figure 4B:
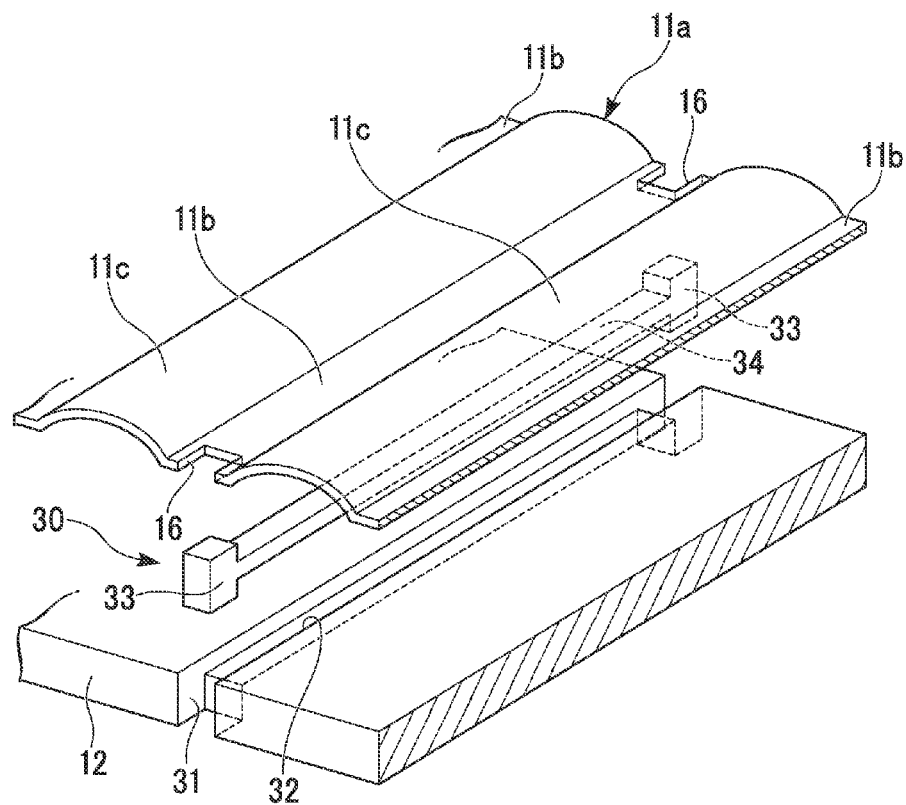
FIG. 4B is an exploded perspective view of a main portion of FIG. 4A.
Figure 4C:
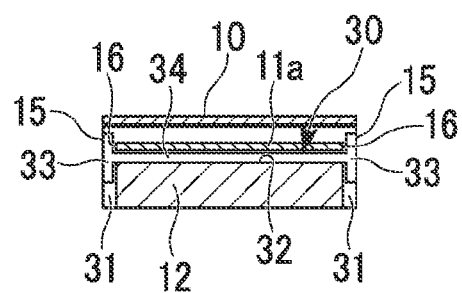
FIG. 4C is a cross-sectional view taken along line B-B of FIG. 4A.

In addition, as shown in FIG. 4B which is an exploded perspective view of a main portion of FIG. 4A, an engagement groove 32 which communicates with the pair of engagement-depressed portions 31 is formed on the inner circumferential surface of the bearing housing 12 between the pair of engagement-depressed portions 31 which are opposite to each other in the axial direction. The depth of the engagement groove 32 toward the outer circumferential surface of the bearing housing 12 is less than the depth of the engagement-depressed portion 31 (equal to the thickness of the bearing housing 12 in the present embodiment). Accordingly, in the present embodiment, a step (refer to FIG. 4B) is formed between the engagement-depressed portion 31 and the engagement groove 32.

The locking member 30 is locked into the pair of engagement-depressed portions 31 and the engagement groove 32. The locking member 30 includes a pair of engagement arms 33 which engages with the pair of engagement-depressed portions 31, and a connection portion 34 which connects the pair of engagement arms 33. The entire locking member 30 is formed into an H shape. As shown in FIG. 4C which is a cross-sectional view taken along line B-B of FIG. 4A, the connection portion 34 is accommodated in the engagement groove 32 so as to engage with the engagement groove 32. The connection portion 34 is formed so as not to protrude to the outside of the engagement groove 32. Specifically, the depth of the engagement groove 32 is approximately 1 to 2 mm, and accordingly, the height of the connection portion 34 is also approximately 1 to 2 mm.

The pair of engagement arms 33 are formed so as to extend in the up-down direction (the radial direction of the bearing housing 12) from both ends of the connection portion 34. Accordingly, as described above, the locking member 30 is formed into an H shape. Parts of the engagement arms 33 extending upward (toward the inner side in the radial direction; toward the rotary shaft 1), that is, parts of the engagement arms 33 which are opposite to portions thereof engaging with the engagement-depressed portions 31 are provided so as to protrude from the inner circumferential surface of the bearing housing 12. Accordingly, the parts of the engagement arms 33 extending upward compose the engagement-projecting portions 15 in the present invention.

Therefore, the engagement notches 16 of the back foil piece 11a engage with the parts of the engagement arms 33 extending upward, and in this state, three back foil pieces 11a are disposed on the inner circumferential surface of the bearing housing 12. In this way, the back foil pieces 11a are disposed on the inner circumferential surface of the bearing housing 12, particularly, the connection portion 34 is pressed by the back foil piece 11a, and thus, detachment of the locking member 30 from the bearing housing 12 is prevented.

Moreover, the portions extending the lower side (radially outer side) of the engagement arm 33 are locked into the above-described steps between the engagement-depressed portions 31 and the engagement groove 32. Therefore, the movement of the locking member 30 in the axial direction with respect to the bearing housing 12 is restricted.

Moreover, the engagement arm 33 or the connection portion 34 of the locking member 30 may be a square columnar shape as shown in FIG. 4B, or may be a columnar shape (round bar shape). A thickness of the engagement arm 33 or the connection portion 34 is approximately 0.3 to 0.5 mm. For example, the locking member 30 can be obtained by forming a metal foil of stainless steel or the like having a thickness less than 0.5 mm into an H shape using etching processing.

In addition, although the processing method is different according to the width size of the engagement-depressed portion 31 or the engagement groove 32, the engagement-depressed portion 31 or the engagement groove 32 can be formed through wire-cut electric discharge machining, cutting processing using an end mill, or the like. The locking member 30 is inserted and locked into the engagement-depressed portions 31 and the engagement groove 32 from a side of the inner circumferential surface of the bearing housing 12, and thus, the engagement-projecting portions 15 can be easily formed.

Also in the radial foil bearing 3A of the present embodiment, the engagement notches 16 of the back foil piece 11a engage with the engagement-projecting portions 15 which is formed of the locking member 30, and thus, the back foil piece 11a is fixed to the bearing housing 12. Accordingly, the back foil piece 11a can be accommodated and fixed into the bearing housing 12 without performing spot welding or bending on the back foil pieces 11a. Accordingly, the occurrence of distortion of the top foil 10 due to the influence of distortion of the back foil 11 (back foil piece 11*a*) caused by the spot welding or the bending can be prevented, and thus, the distortion of the top foil 10 can be sufficiently decreased. Therefore, favorable performance as designed can be obtained in load capability or dynamic characteristics (rigidity and damping performance) of the bearing.

In addition, since the engagement-projecting portions 15 are formed using the locking member 30, the engagement-projecting portions 15 can be formed in the bearing housing 12 through relatively simple processing and assembly.

Moreover, the present invention is not limited to the above-described embodiments and is limited only by the scopes of attached claims. A shape, a combination, or the like of each component shown in the above-described embodiments is an example, and addition, omission, replacement, and other modifications of configurations can be performed within the scope of and not departing from the gist of the present invention.

For example, in the above embodiments, the back foil 11 is configured of three back foil pieces 11*a*. However, the entire back foil 11 may be configured by forming one metal foil into an approximately cylindrical shape. Moreover, when the back foil 11 is configured of a plurality of back foil pieces 11*a*, the back foil 11 may be configured of two or four or more back foil pieces 11*a*.

When the entire back foil 11 is configured using one metal foil, the engagement notches 16 may be formed at the center portion in the circumferential direction of the metal foil.

In addition, in the above embodiments, the engagement notches 16 are formed at the center portion in the circumferential direction of the back foil piece 11*a*, the engagement-depressed portions 15 are locked into the engagement notches 16, and thus, the formation location of the engagement notches 16 is set to the fixation end (fixation point) of the back foil piece 11*a*. However, similar to the related art, the engagement notch 16 may be formed on the end (the end in the circumferential direction) of the back foil piece 11*a*. Similarly, even when the entire back foil 11 is configured of one metal foil, the engagement notch 16 may be formed on the end of the back foil 11.

Moreover, in the above embodiments, the engagement-projecting portion 15 is formed on the outermost side end of the inner circumferential surface of the bearing housing 12, that is, the engagement-projecting portion 15 is formed to be flush with the side surface of the bearing housing 12. However, the present invention is not limited to this configuration, and slightly inner sides (inner side in the axial direction) from the outermost side ends of the inner circumferential surface may be within the range of both ends of the inner circumferential surface in the present invention. Specifically, as shown in FIG. 5, when lengths L1 in the axial direction of the back foil 11 (back foil piece 11*a*) and the top foil 10 are less than a length L2 in the axial direction of the bearing housing 12, the engagement-projecting portions 15 may be formed at slightly inner sides from the outermost side ends of the inner circumferential surface of the bearing housing 12 so as to correspond to the length of the back foil 11.

That is, in order to correspond to the lengths L1 in the axial direction of the back foil 11 (back foil piece 11*a*) and the top foil 10 which are required in the design, the positions of the engagement-projecting portions 15 may be determined so that outer side surfaces 15*a* of the engagement-projecting portions 15 are positioned inside the side surfaces of the bearing housing 12. Moreover, the formation positions of the engagement-projecting portions 15 may not be bilateral symmetry in the axial direction on the inner circumferential surface of the bearing housing 12 but may be asymmetry.

Figure 5:
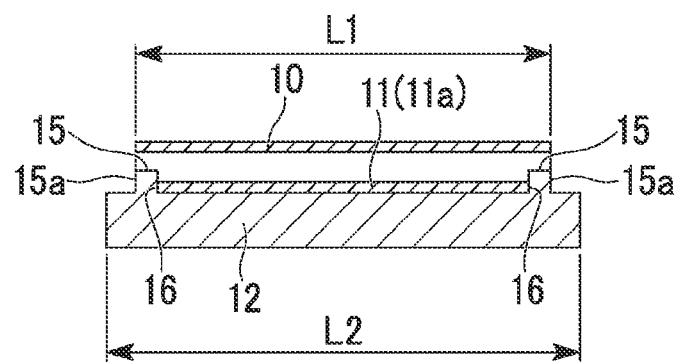
FIG. 5 is a main portion cross-sectional view showing a modification of the present invention.

Moreover, as shown in FIG. 5, even when the engagement-projecting portions 15 are formed at slightly inner sides from the outermost side ends of the inner circumferential surface of the bearing housing 12, the engagement-projecting portions 15 may be formed of the locking member as shown in the second embodiment.

In addition, in the second embodiment, the engagement-depressed portion 31 is formed into a groove shape which is cut out from the inner circumferential surface of the bearing housing 12 to the outer circumferential surface thereof. On the other hand, if the engagement-depressed portion extends from the inner circumferential surface of the bearing housing 12 toward the outer circumferential surface, the engagement-depressed portion may be formed by cutting out a portion of the bearing housing 12 to the front side of the outer circumferential surface without reaching the outer circumferential surface. Moreover, when the machining of the engagement-depressed portion is difficult or the like, the width (the width in the circumferential direction) of the engagement-depressed portion may be greater than the width of the engagement groove 32. In this case, the engagement arm 33 of the locking member 30 may engage with the engagement-depressed portion with a large clearance.

In addition, with respect to the formation of the engagement-projecting portion, without using the locking member having an H shape shown in the second embodiment, an engagement arm having a bar shape (columnar shape) extending only in the radial direction of the bearing may be engaged with and fixed to the engagement-depressed portion 31, thereby forming the engagement-projecting portion. In this case, with respect to the fixation of the engagement arm to the engagement-depressed portion 31, press fitting (interference fit), screw fastening, adhesion by adhesive having high heat-resistance, or the like may be adopted.

In addition, in the above-described embodiments, the top foil 10 is not fixed through welding, the one end 10*a* engages with the groove 13 which is formed in the bearing housing 12, and thus, the top foil 10 is accommodated and fixed into the bearing housing 12. However, the fixation of the top foil 10 may be performed using arbitrary means including the welding.

INDUSTRIAL APPLICABILITY

The present invention can be applied to a radial foil bearing which surrounds a rotary shaft and supports the rotary shaft.

REFERENCE SIGNS LIST

1 rotary shaft
3, 3A radial foil bearing
10 top foil
11 back foil
11*a* back foil piece
11*b* valley portion
11*c* peak portion
12 bearing housing
15 engagement-projecting portion
16 engagement notch
30 locking member
31 engagement-depressed portion
32 engagement groove
33 engagement arm
34 connection portion

The invention claimed is:
1. A radial foil bearing for surrounding and supporting a rotary shaft, the radial foil bearing comprising:

a cylindrical top foil disposed so as to face the rotary shaft;
a back foil disposed at a radially outer side of the top foil; and
a cylindrical bearing housing accommodating the top foil and the back foil,
wherein engagement-projecting portions are provided on both ends of an inner circumferential surface of the bearing housing, and
engagement notches engaging with the engagement-projecting portions are formed on both ends of the back foil.

2. The radial foil bearing according to claim 1, wherein the engagement notches are formed at a center portion in a circumferential direction of the back foil.

3. The radial foil bearing according to claim 1, wherein the back foil is formed into a wave shape in which valley portions contacting the bearing housing and peak portions contacting the top foil are alternately formed in a circumferential direction of the bearing housing, and the engagement notches are formed on a valley portion.

4. The radial foil bearing according to claim 1, wherein the back foil is configured to include back foil pieces which are disposed in a circumferential direction of the top foil, and
the engagement notches are formed in each of the back foil pieces.

5. The radial foil bearing according to claim 4, wherein the engagement notches are formed at a center portion in a circumferential direction of a back foil piece.

6. The radial foil bearing according to claim 4, wherein a back foil piece is formed into a wave shape in which valley portions contacting the bearing housing and peak portions contacting the top foil are alternately formed in a circumferential direction of the bearing housing, and
the engagement notches are formed on a valley portion.

7. The radial foil bearing according to claim 1, wherein engagement-depressed portions, which extend from the inner circumferential surface of the bearing housing toward an outer circumferential surface thereof, are formed on both side surfaces of the bearing housing so as to be opposite to each other,
an engagement groove is formed on the inner circumferential surface of the bearing housing between the engagement-depressed portions opposite to each other, wherein the engagement groove communicates with the engagement-depressed portions and a depth of the engagement groove toward the outer circumferential surface of the bearing housing is less than that of the engagement-depressed portions,
a locking member is locked into the engagement-depressed portions and the engagement groove,
the locking member includes a pair of engagement arms which engage with the engagement-depressed portions and a connection portion which engages with the engagement groove and connects the pair of engagement arms,
parts of the pair of engagement arms opposite to portions thereof engaging with the engagement-depressed portions are provided so as to project from the inner circumferential surface of the bearing housing, and
the engagement-projecting portions are composed of the parts of the pair of engagement arms.

8. The radial foil bearing according to claim 7, wherein the engagement notches are formed at a center portion in a circumferential direction of the back foil.

9. The radial foil bearing according to claim 7, wherein the back foil is formed into a wave shape in which valley portions contacting the bearing housing and peak portions contacting the top foil are alternately formed in a circumferential direction of the bearing housing, and
the engagement notches are formed on a valley portion.

10. The radial foil bearing according to claim 7, wherein the back foil is configured to include back foil pieces which are disposed in a circumferential direction of the top foil, and
the engagement notches are formed in each of the back foil pieces.

11. The radial foil bearing according to claim 10, wherein the engagement notches are formed at a center portion in a circumferential direction of a back foil piece.

12. The radial foil bearing according to claim 10, wherein a back foil piece is formed into a wave shape in which valley portions contacting the bearing housing and peak portions contacting the top foil are alternately formed in a circumferential direction of the bearing housing, and
the engagement notches are formed on a valley portion.

\* \* \* \* \*